June 16, 1931. W. J. MILLER 1,809,861
AUTOMATIC MANUFACTURE OF POTTERY WARE
Filed Jan. 19, 1928 3 Sheets-Sheet 1
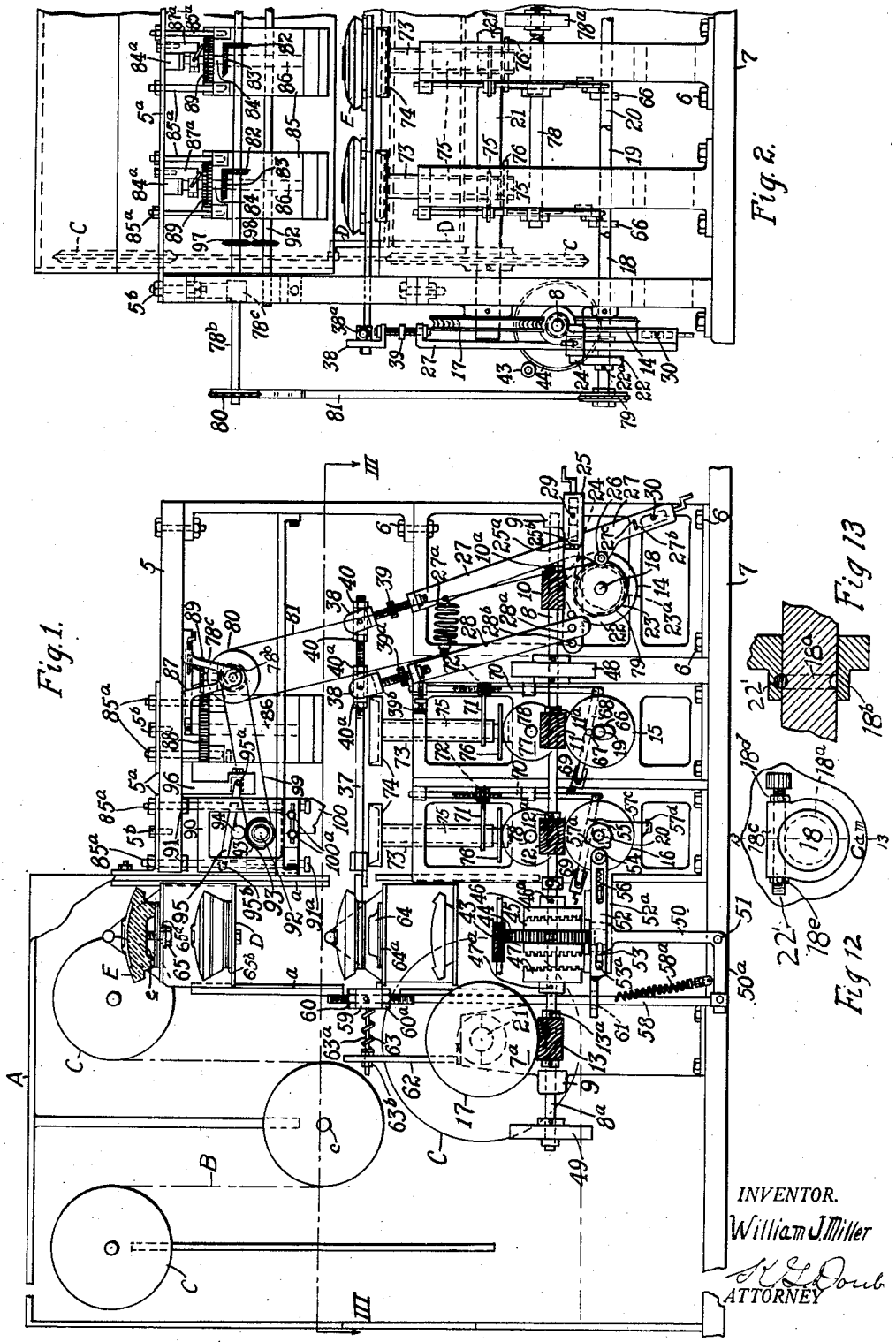
INVENTOR.
William J. Miller
ATTORNEY

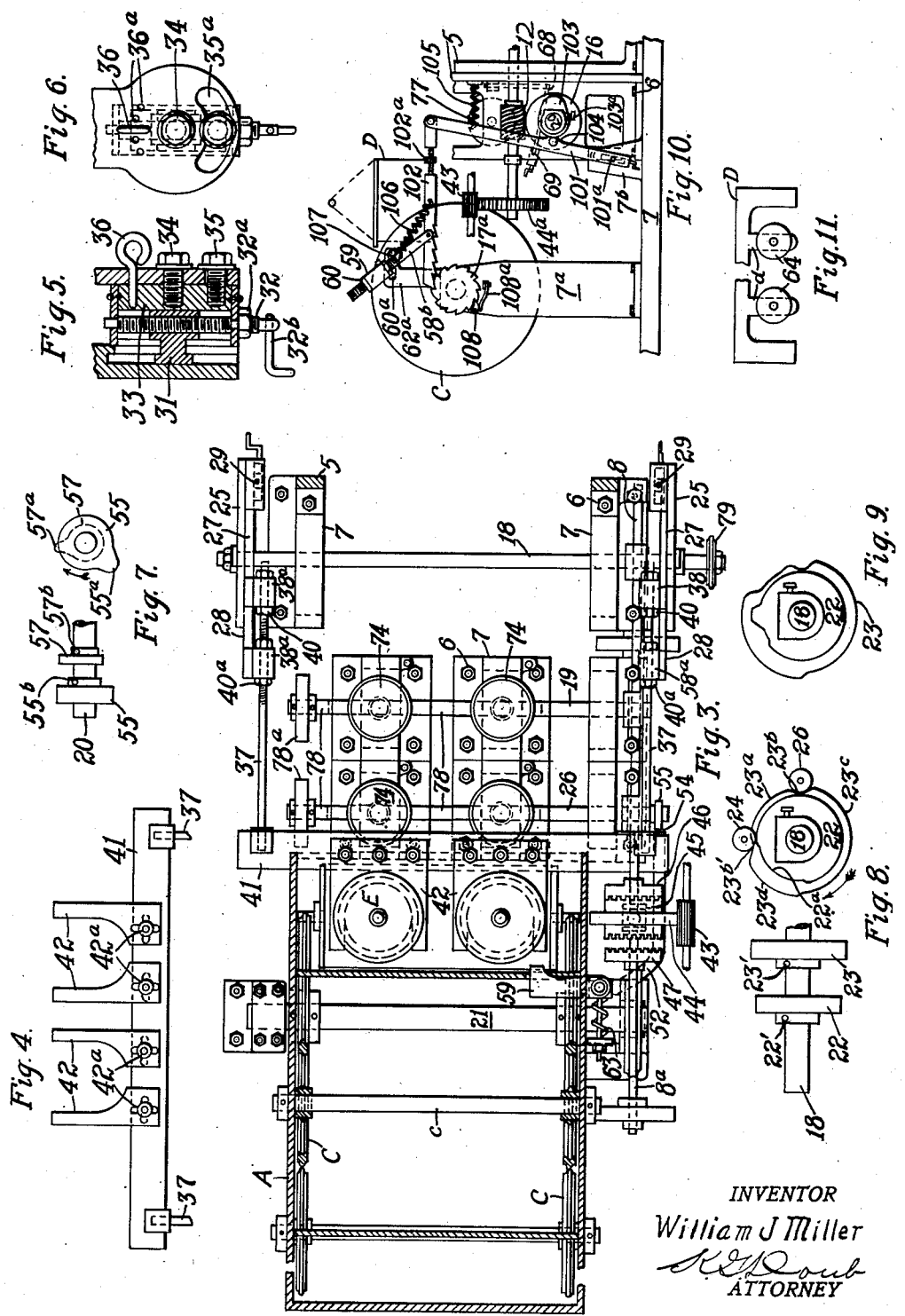

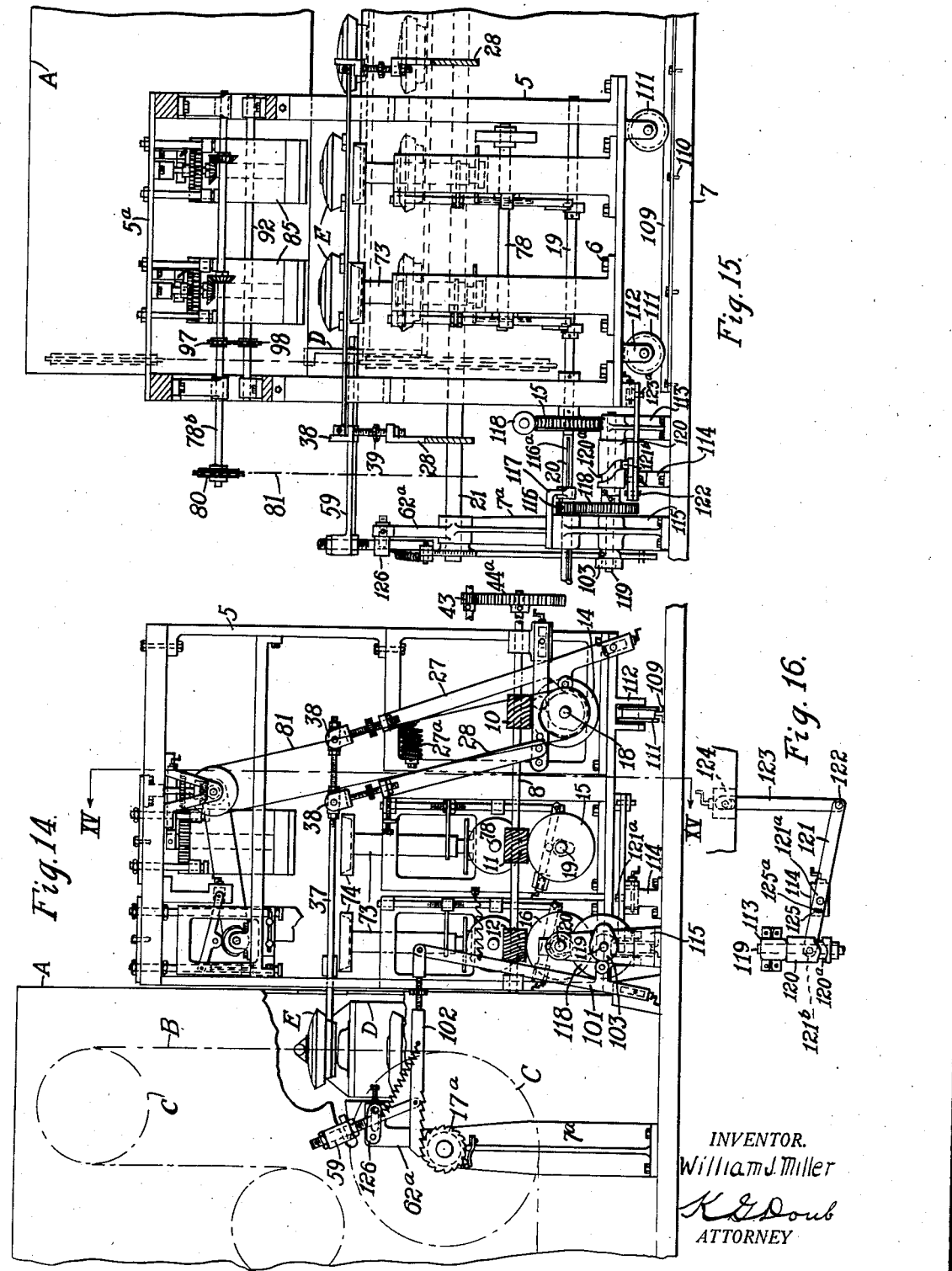

Patented June 16, 1931

1,809,861

UNITED STATES PATENT OFFICE

WILLIAM J. MILLER, OF SWISSVALE, PENNSYLVANIA

AUTOMATIC MANUFACTURE OF POTTERY WARE

Application filed January 19, 1928. Serial No. 247,957.

This invention relates to the automatic manufacture of pottery ware and more particularly to mechanism or apparatus which may be disposed in operative adjacency to a drier,—preferably of that type wherein the molds containing the ware are disposed on carriers or trays through an opening in the wall of the drier and intermittently or continuously conveyed therethrough at a speed commensurate with the most efficient drying of the ware,—and adjustable to operate in synchronism or in timed relation with a conveying means that may be installed in the drier, the empty molds being automatically removed from the drier by the apparatus and the plastic clay fed thereto and formed and then returned to the drier, the complete operation being automatic and various parts of the mechanism being adjustable while in operation and while the driving connection subsists to assist in the efficient functioning of the apparatus.

One object of the invention, therefore, is to provide mechanism which will practically operate to automatically remove empty molds from an intermittently or continuously driven conveyor in a drier and feed charges of plastic material to the molds and form or shape the charges and then return the molds bearing the formed charges to the conveyor in synchronism with the movement or drive of the latter.

Another object of the invention is to provide mechanism of the character specified wherein the phase of motion of some of the essential working parts may be varied or adjusted while in operation and while the driving connection subsists.

Another object of the invention is to provide mechanism of the class specified wherein parts may be adjusted while in operation and while the driving connection subsists, thus permitting an approximate initial timing and setting of the mechanism and subsequent accurate timing and adjustment and variation in movement of some of the essential working parts of the apparatus without cessation of operation of the latter.

Another object of the invention is to provide mechanism of the class specified which may be readily installed and adapted to operate in conjunction with conveyors and driers as now generally used without requiring radical changes in construction and excessive cost of installation.

Another object of the invention is to provide means in apparatus of the class specified which may be adjusted to automatically compensate for irregularities in the relative mounting and spacing of the mold carriers in the conveyor chain or other flexible member and which might otherwise detract from the efficient operation of the apparatus.

Another object of the invention is to provide means for moving fabricating mechanism as a unit along the longitudinal extent of a tray carrying molds and successively operate on said molds.

Among other objects are, to provide means in apparatus of the class specified for spotting or ensuring accurate positioning of the molds on the mold carriers, and means for positioning the mold carriers relatively to the mold transfer means at the time of transfer of the molds from and to the carriers.

With the foregoing and other objects and advantages in view, the invention consists in the preferred construction and arrangement of the several parts which will be more fully hereinafter described and claimed.

In the drawings:

Figure 1 is a view, principally in side elevation, of one preferred form of apparatus embodying the features of the invention installed in conjunction with a drier, the side wall of the latter being removed for the purposes of illustration;

Fig. 2 is a fragmentary end elevation of the apparatus;

Fig. 3 is a horizontal sectional plan view on the line 3—3, Fig. 1;

Fig. 4 is a detail plan view of an assembly;

Fig. 5 is an enlarged detail sectional plan view of a preferred form of adjustment structure;

Fig. 6 is a side elevation of the same;

Figs. 7 and 8 are enlarged detail views of preferred forms of cams;

Fig. 9 is a similar view of modified forms of cams;

Fig. 10 is a view in side elevation of a modified form of driving mechanism;

Fig. 11 illustrates in broken plan view a modified form of mold carrier;

Fig. 12 is an enlarged detail view in end elevation of a further preferred form of adjustment structure;

Fig. 13 is a section taken on the line 13—13, Fig. 12;

Fig. 14 is a view similar to Fig. 1 of a modification in structure;

Fig. 15 is a section taken on the line 15—15, Fig. 14, and

Fig. 16 is a detail plan view of parts embodied in Figs. 14 and 15.

The numeral 5 generally designates the main stationary frame of the apparatus, which may be made or cast in sections and assembled in detachable association as by bolts 6 on a base 7. In the form shown by Figs. 1, 2 and 3, a main drive shaft formed in two sections 8 and $8^a$ is provided and mounted in suitable bearings 9 in longitudinal alinement, worms 10, 11, 12 and 13 being adjustably secured on said shaft as by screws $10^a$, $11^a$, $12^a$ and $13^a$ extending through the hubs of said worms, the latter being adapted to respectively engage worm gears 14, 15, 16 and 17, which are similarly adjustably secured on shafts 18, 19, 20 and 21, extending at right angles to the main drive shaft 8—$8^a$ and mounted in suitable bearings on the main frame 5, a bearing pedestal $7^a$ being provided for shaft 21. The shaft 18 is provided with cams 22 and 23, shown in detail in Fig. 8, and adjustably secured by screws 22′ and 23′ preferably as shown in detail in Figs. 12 and 13, cam 22 being adapted to contact with a roller 24, rotatably mounted on a lever 25, and cam 23 with a roller 26, rotatably mounted on a lever 27, lever 25 being adjustably pivoted at one extremity as at $28^a$ to a link or bar 28 as by providing a plurality of pivoting holes $28^b$ in said lever 25, the link 28 extending upwardly in a plane substantially parallel with lever 27.

The construction illustrated in Figs. 12 and 13 is adopted with a view to permitting change in the phase of motion of the parts primarily actuated by the cams to which said structure may be applied, while said parts are in operation and while the driving connection subsists. The shaft 18, (or any other shaft to which this structure may be applied), is formed with an annular threaded groove $18^a$ and the hub $18^b$ of the cam applied to said shaft formed with a bracket portion $18^c$, which is bored to form a sleeve for screw 22′, the latter being provided with an adjusting head or analogous portion. Collars or analogous members $18^d$ are threaded on screw 22′ and adjusted against each side of bracket $18^c$, to prevent displacement of screw 22′, set screws $18^e$ being provided to maintain said collars in adjusted position. As the shaft 18 only revolves at an approximate rate of ten revolutions per minute, screw 22′ may be adjusted while in operation and while the driving connection subsists to thereby adjust the position of the cam on the shaft to which it may be applied, the threads of screw 22′ engaging in the threads of the annular groove $18^a$.

Cams 22 and 23 may be shaped in accordance with the movements desired to be imparted to the parts primarily actuated thereby, and in the present instance cam 22 is formed with a depression $22^a$, and cam 23 with a low part $23^a$, two slight depressions $23^b$ and $23^{b\prime}$, and a raised part $23^c$ and high part $23^d$.

Levers 25 and 27 are preferably pivoted at 29 and 30 to the frame 5 through the medium of the sliding block structure shown in detail in Figs. 5 and 6 and whereby the throw of these levers may be varied or adjusted while in operation and while the driving connection subsists. This adjustment assembly preferably comprises a pivot or journal block 31, which is journaled in a longitudinally slotted portion of the lever or member to be pivoted or fulcrumed, as the case may be, and bored and threaded for insertion of an adjusting and retaining screw 32, said block 31 being also mounted to shift or slide, when adjusting screw 32, in a longitudinal slotted portion of a block or analogous member 33, the journal or bearing portion of block 31 being headed and the side walls of the longitudinally slotted portion of the lever or member to be pivoted or fulcrumed formed with a retaining track or groove for said head. Block 33 is adjustably secured to the frame or casting 5 of the apparatus as by screw bolts 34 and 35 and positioning pin 36, the frame 5 being arcuately slotted as at $35^a$ where the bolt 35 extends therethrough and a plurality of positioning holes $36^a$ provided in said frame for pin 36. By loosening bolts 34 and 35, pin 36 may be adjusted in any of said holes, to definitely locate or spot the angular position of block 33 relatively to the frame 5 and lever or other member to be pivoted or fulcrumed, while screw bolt 35 may be adjusted in slot $35^a$ to accomplish the same result independent of pin 38 and intermediate of holes $36^a$. Adjusting screw 32 is journaled in said block 33 and provided with a thrust or bearing collar or set nut $32^a$ and handle $32^b$. It will be seen that by turning screw 32, journal block 31 may be shifted in the slotted portions or guideway provided therefor and thus shift the pivotal or fulcrum point of the lever or member to be pivoted or fulcrumed and vary the throw of said member or the extent of reciprocation thereof while in operation and while the driving or pivotal connection subsists. By adjusting the angle of block 33, various advantageous results may be obtained. For instance, the extent of reciprocation may be varied without varying the lowermost point of reciprocation, or the extent of reciprocation may be varied without varying the uppermost point of reciprocation, or the altitude of reciprocation or intermediate point of reciprocation maintained constant while at the same time varying the extent of reciprocation, or the lowermost point of reciprocation may be varied to a greater or less extent than the uppermost point of reciprocation, and vice versa, or the altitude of reciprocation varied.

The lever and cam mechanism above described is preferably provided on each side of the apparatus, and at their upper extremities said levers 27 and 28 are pivotally and adjustably connected to rods 37 as by terminal brackets 38 and sleeves 38ª and turnbuckles 39 and 39ª, said rods 37 being passed through said sleeves 38ª and adjustably secured as by set nuts 40 and 40ª, and at their opposite extremities these rods are suitably secured to a cross bracket or analogous member 41, shown in detail in Fig. 4, which serves to support adjustable mold-transferring and carrying members 42, adjustably secured to said cross bracket 41 as at 42ª. A retracting spring 27ª is adjustably secured to the frame 5 at one extremity and at its opposite extremity connected to lever 27, to retract levers 27 and 28 when actuated by cams 22 and 23. An adjusting screw 39ᵇ is mounted on the frame or casting 5 and adjusted relatively to link or bar 28, to adjust while in operation the forward travel of bar 28 and lever 27 regardless of the extent of rearward travel of said members. Lever 27 is slotted at a suitable point above the lower pivotal point thereof as at 27ᵇ and a pin or stud 27ᶜ formed integral with or attached to the frame 5 and adapted to engage in said slot, to maintain lever 27 in upright position, and lever 25 is formed with a similar slot 25ª and a pin or stud 25ᵇ formed on frame 5, to prevent horizontal displacement of said lever 25, which might be caused by lateral stress or strain.

The two-part drive shaft 8—8ª is primarily driven by a suitable motor or from a line shaft or other source, the drive in the form shown by Figs. 1, 2 and 3 being alternately applied to the parts 8 and 8ª, and with this end in view, it is preferred to provide an elongated drive pinion or gear 43, which may be secured directly on the armature shaft of the motor if the latter is used, said pinion 43 being in continual mesh with a ring gear 44, which is suitably secured on a clutch drum 45, said drum being rotatably and longitudinally slidably mounted on the alined ends of the shaft 8—8ª, each side of the drum 45 being formed with teeth or other engaging elements adapted to intermittently and alternately engage or mesh with similar elements of clutch gears 46 and 47, the latter being respectively adjustably secured on the shaft 8—8ª as by screws 46ª and 47ª threaded through the hubs of said gears into contact with shaft 8—8ª. The type of clutch herein illustrated may be varied as best adapted for the load or work involved, or the clutch may be of the friction or positive or semipositive type, as will be understood, and to prevent a too sudden stop of the machinery upon disengagement of the clutch, or stopping of the machinery before the various working parts may have reached their predetermined positions of rest, fly-wheels 48 and 49 are removably and adjustably secured on shaft 8—8ª. A clutch fork 50 is pivotally mounted on the base 7 of the apparatus as at 51, said fork being formed with a bell crank extremity 50ª for a purpose which will presently be apparent. A latch-tripping pitman or bar 52 is mounted to slide longitudinally in a bracket extension 52ª of the frame 5, said pitman being longitudinally slotted as at 53 and a pin 53ª secured in said bracket extension and projecting into said slot, to assist in guiding and maintaining said bar in position. A cam-contacting roller 54 is rotatably mounted at one extremity of the pitman or bar 52, said roller being adapted to contact with a cam 55, shown in detail in Fig. 7, formed with a raised part 55ª and adjustably secured on shaft 20 as by screw 55ᵇ, and to maintain roller 54 in contact with cam 55, said bar 52 is formed with a further longitudinal slot for insertion of a suitable compression spring 56, adapted to bear at one end against a pin or lug also secured in the bracket extension 52ª and at its opposite end against the end or seat formed by the slotted portion of bar 52.

It may be desired to spot the position of rest of that part of the apparatus primarily driven by shaft 8, and with this end in view, a further cam 57, also shown in detail in Fig. 7 and formed with a raised part or radial projection 57ª, is adjustably secured on shaft 20 as shown in detail in Figs. 12 and 13 by screw 57ᵇ. A spring 57ᶜ, preferably shaped at its upper free extremity in accordance with the shape of the raised part or projection 57ª of cam 57, is adjustably secured to the stationary frame or casting 5 as at 57ᵈ and adjusted to bear against cam 57. By this means, when the clutch is disengaged from part 8 of the main drive shaft 8—8ª and the mechanism primarily actuated thereby runs free, cam 57 will be stopped when the raised part 57ª thereof registers with the recess formed by the upper extremity of spring 57ᶜ and consequently stop the mechanism primarily actuated by part 8 of the drive shaft 8—8ª, and by adjusting cam 57 on shaft 20, the position of rest of said mechanism may be predetermined. The tension adjustment of spring 57ᶜ should be sufficient to overcome the momentum given the machinery by fly-wheel 48, which in turn should be proportioned for best results, as will be understood.

An upright bar or pitman 58 is pivoted at its lower extremity to the one extremity of the bell crank 50ª of clutch fork 50, said bar 58 being threaded on its upper extremity and a latch member 59 applied thereover and held in adjusted position by upper and lower set nuts 60 and 60ª. The bar or pitman 58 extends loosely through a cut-out portion or hole in the one extremity of the horizontal pitman 52, as at 61, for a purpose which will be hereinafter apparent. An upright bracket 62 is suitably secured to the bearing pedestal 7ª and a compression spring 63 interposed between said bracket and latch 59, said spring being mounted on a pivot bolt 63ª which is pivotally secured at one extremity to the latch 59 and at its opposite extremity loosely passed through a hole in the upper extremity of the bracket 62 and adjustably secured as by a nut 63ᵇ. A further spring 58ª is adjustably secured at one extremity to the base frame 7 and at its opposite extremity connected to bar 58. It will be seen that the bar or pitman 58 and latch 59 is maintained under adjustable spring pressure toward the right as viewed in Fig. 1 and also moves vertically against the tension of spring 58ª.

For the purposes of illustration, a drier of the usual type is outlined in the drawings and generally indicated at A and a conveyor chain at B, the latter passing over sprockets C mounted on shafts c and shaft 21, and the part 8ª of the main drive shaft serves to primarily actuate the conveyor. Mold carriers or trays D are swingably mounted in series in the conveyor chain so as to always be maintained in a horizontal plane, said trays preferably being provided with mold-centering and positioning and spotting means in the form of bosses 64, provided with annular flanges 64ª, said bosses being removably and adjustably secured to the tray D as by bolts 65, enlarged openings 65ª being formed for bolts 65 in said tray and shims 65ᵇ being interposed between said bosses and tray, to provide for vertical and lateral adjustment of said bosses 64. The molds E are formed with a recessed portion e to fit these bosses 64, and this particular construction of the molds and trays may be standardized. By this means the molds may be accurately positioned and maintained in removable position on the trays D, and the flanges 64ª of the bosses 64 serve to hold the molds elevated a sufficient distance above the tray board or other type of support to permit, with some degree of play, the mold carrying members 42 to slide under the flange portion usually formed on molds as commonly constructed preparatory to lifting the mold from the tray, as will be more fully hereinafter explained. The latch 59 is adapted to catch over the tray board or bottom when the said trays reach a predetermined adjusted position and maintain the tray in stable position while the molds are removed and clay fed to the molds and formed and the molds replaced on the tray, as will be also more fully hereinafter explained, said latch being released by the high part 55ª of cam 55 moving pitman or bar 52 to the left as viewed in Fig. 1 and consequently rocking pitman 58 with said latch secured thereon also to the left against spring 63.

Reciprocating and rotating chucks are provided in the present apparatus for supporting the molds while the clay is fed thereto and formed, and to gain a clear understanding of this particular structure, reference is made to my copending application Serial No. 166,180, filed Feb. 5, 1927 which has become Patent No. 1,655,431. Cams 66 are adjustably secured on the shafts 19 and 20, said cams being adapted to contact with cam-rollers 67, rotatably mounted on levers 68, adjustably pivoted at one extremity through the medium of the structure shown in detail by Figs. 5 and 6, as at 69, and at their opposite extremities said levers being pivoted to pitmen 70, which extend upwardly through portions of and are guided by the frame 5, cross forks 71 being adjustably secured at one extremity to said pitmen as at 72 and at their opposite extremities fitted into necked portions of hollow jigger spindles 73, which terminate in chucks 74. The hollow spindles 73 are in spline-sliding engagement and telescoped over spindles 75, indicated in dotted lines, and on said latter spindles friction gears or disks 76 are secured, said gears 76 being adapted to intermittently contact with continuous motion friction gears 77, secured on shafts 78, the latter preferably being independently driven and provided with pulleys 78ª with this end in view. However, these shafts 78 may be driven from any source or connected and driven in timed relation with the apparatus, as will be obvious.

To automatically feed the plastic material or clay to the molds, it is preferred to adopt the structure disclosed by my copending application Serial No. 166,179, filed Feb. 5, 1927, and by referring to said application this feeding mechanism may be readily understood and only a method of driving the same is therefore illustrated in the present instance. The numeral 78ᵇ designates an upper drive shaft, which is connected and driven in synchronism with the lower shaft 18 as by providing said shafts with suitable positive driving means such as sprockets 79 and 80 and a flexible positive connecting member such as a chain 81. Hanger brackets 78ᶜ are suitably secured to the upper frame 5 for supporting shaft 78ᵇ, the latter extending across the width of the apparatus and being provided with bevel or mitre gears 82, meshing with corresponding gears 83 secured on stub shafts 84, the latter being mounted in bearing brackets 84ª secured to and depending from cross braces 5ª adjustably secured on the upper frame 5 as by screw bolts 5$^b$. Containers 85 for plastic material are also adjustably secured to and supported from said cross braces as by bolts 85$^a$. These containers as illustrated in my copending application above noted may be reciprocated and rotated. However, in the present instance they are preferably stationarily mounted and the plungers only reciprocated and rotated, said plungers being indicated in dotted lines at 86 and swiveled to the one extremity of levers 87, the opposite extremities of said levers being pivotally secured to brackets 87$^a$, the pivotal point being adjustable while in operation through the medium of the structure shown in detail by Figs. 5 and 6. Levers 87 are extended down at an intermediate point and provided with cam rollers, not shown, adapted to contact with cams, also not shown, adjustably mounted on shaft 78$^b$, to thereby reciprocate said plungers, as will be understood by referring to my copending application above noted. The upper extremities of said plungers have adjustably secured thereon gears 88, of such width as will accommodate the reciprocation of the plungers, said gears meshing with gears 89, secured on the stub shafts 84. It will be seen that the plungers may be reciprocated and rotated in timed relation to the reciprocation and rotation of the chucks and molds, to feed charges or batches of plastic material to the latter, and this structure with its operation and attendant advantages may be readily understood by referring to my copending application Serial No. 166,179, as above noted.

To form the ware including the trimming and excess-material-removing operations, I prefer to adopt the structures disclosed by my copending applications Serial No. 225,992, filed Oct. 13, 1927, and 159,143, filed January 5, 1927, and as these structures may also be readily understood by referring to said applications, a detail showing and description is not considered necessary in the present instance.

The numeral 90 generally designates a movable frame assembly which is mounted to reciprocate vertically on guide posts 91, the latter being adjustably secured to the cross braces 5$^a$ as by the bolts and nuts 85$^a$, said guide posts being formed with lower stop heads 91$^a$, which in some instances serve to support the frame 90 when in its lowermost position. Reciprocation may be imparted to the frame 90 as by mounting a shaft 92 in suitable bearings on the main frame 5 and adjustably securing thereon a cam 93, said cam contacting with a cam roller 94, rotatably mounted on the intermediate portion of a lever 95, the one extremity of said lever being adjustably pivoted at 95$^a$, preferably by the structure illustrated in Figs. 5 and 6, to a bracket 96, which may also be secured to the cross braces 5$^a$, and the opposite extremity of lever 95 adjustably pivoted to the frame 90 as at 95$^b$ in a manner which may be understood by referring to my copending application Serial No. 225,992, above noted. Sprockets or analogous members 97 and 98 are mounted respectively on shafts 78$^b$ and 92 and connected by a suitable positive flexible member or chain 99 and these shafts driven in synchronism. A profile or shaping tool 100 is adjustably secured to the frame 90 as at 100$^a$, this shaping tool being adapted to shallow ware in the present instance. However, this tool 100 may be of that type particularly adapted for the work being performed, and any number of these tools may be provided and mounted in any suitable manner, the invention not being limited in this respect, and likewise, a trimmer may be provided and also mounted in a manner as clearly disclosed by my copending application Serial No. 225,992, above noted.

The wall of the drier A is constructed in such manner as will permit removal and replacement of the molds with the least possible escape of the conditioned atmosphere of the drier, and in the present instance this part of the drier also serves as guiding means for the trays or mold carriers D as at $a$ and prevents swinging of the latter while the molds are removed from and replaced on said trays or carriers D.

In operation, let it be assumed that shafts 18, 19 and 20 are to be driven or rotated in a clockwise direction and shaft 21 in a counter-clockwise direction. Then in the position as illustrated in the drawings, a mold bearing a freshly formed article of ware is about to be deposited onto the centering and positioning boss 64 of the tray D, cam roller 26 of lever 27 being in depression 23$^b$ of cam 23, which is the limit of retraction of levers 27 and 28 in the example illustrated in Figs. 1, 2 and 3, and cam roller 24 about to move into the depression 22$^a$ of cam 22, which will cause the mold to be lowered onto the boss 64 of tray D, compression spring 63 having caused latch 59 to function and hold the tray locked against vertical movement and guides $a$ preventing lateral and endwise swaying movement or displacement of the trays. Cam 55 should be timed on shaft 20 so that the high part 55$^a$ thereof contacts with roller 54 on bar 52, moving said bar to the left and releasing latch 59 approximately at the time cam roller 26 rides onto the low part 23$^a$ of cam 23, to thereby retract levers 27 and 28 such distance as will cause the mold-transferring members to move back slightly and clear the mold and tray, and as the said latch is released, pitman 58 will be pulled downwardly by spring 58$^a$, actuating bell crank 50$^a$ and forcing clutch fork 50 to the left, to thereby shift the clutch and drive part 8$^a$ of the drive shaft and the conveyor, this drive being continued until the succeeding tray or mold carrier D bearing empty molds comes in contact with latch 59 and pulls pitman 58 upwardly, moving clutch fork 50 to the right and reversing the clutch. The drive then again starts on part 8 of the drive shaft and cam roller 26 rides into depression 23$^{b'}$, to move mold-transferring members 42 under the mold flange. Cam roller 24 then rides out of depression 22$^a$ and the mold is raised clear of the boss 64 on tray D, approximately at which time cam roller 26 rides onto the high part 23$^d$ of cam 23 and the empty mold is carried back under the feeder, the latter being timed to feed a charge of clay onto or in the mold while roller 26 dwells on the high part 23$^d$ of cam 23. Roller 26 then rides off the high part 23$^d$ of cam 23 onto 23$^c$ and the mold is moved forward under the forming or shaping tool 100, cam 93 being timed on shaft 92 to lower frame 90 and bring tool 100 into operative position, and during the feeding and forming operations, it is preferred to reciprocate and rotate the molds as by cams 66 and friction gears 76 and 77 and which may be understood by referring to Patent No. 1,655,431, hereinbefore specified. While the charge is being formed, cam roller 26 dwells on cam raise 23$^c$ of cam 23, after which roller 26 rides into depression 23$^b$ and then roller 24 into 22$^a$ and the mold bearing the ware is deposited onto the tray and the cycle of operations repeated.

It will be noted that as the trays are halted by the latch 59, the adjusted position of said latch determines the position of rest of said trays regardless of irregular spacing of the latter, and by adjusting the travel of the mold-transferring members or forks 42 so that they will lower and contact with and ride into position on the trays as the latter move upwardly, slight irregularities in spacing of the trays in the conveyor chain or other flexible member may be further compensated for. By adjusting the bosses 64 vertically by means of shims 65$^b$, a further means of compensating for irregularities in spacing of trays D is provided.

By adjusting screws or turn buckles 39 and (or) 39$^a$, which may be done while in operation and while the driving connection subsists, the altitude of travel of the mold-transferring members 42 may be varied independently of the horizontal travel of said members, and by adjusting the pivotal points 29 and (or) 30, which may also be effected while in operation and while the driving connection subsists, either or both the vertical and horizontal travel, or the throw of said members may be varied, or by adjusting pivotal point 29, the highest point of travel of said members may be varied without varying the lowest point of travel, and vice versa, and numerous other advantageous adjustments may be obtained while the mechanism is functioning.

By slightly modifying cams 22 and 23 as illustrated in Fig. 9 and properly adjusting the vertical travel of the mold-transferring and carrying members 42, the apparatus may be continuously driven while the empty molds are being removed from the trays and plastic clay fed thereto and formed and the molds returned to the trays. In the event this operation is desired, the trip members,—consisting of cam 55, horizontal and vertical pitmen 52 and 58 and latch 59 and cooperating parts,—may be dismantled or rendered inactive and the clutch gears adjusted on shaft 8—8$^a$ so as to be in continual mesh. Then the vertical travel of mold-transferring members or forks 42 should be adjusted so that they lower and advance a predetermined distance to meet the continuously upwardly moving trays D, the tips of said forks resting momentarily on the tray bottom, then further advancing under the mold flanges, said members then elevating and moving back, carrying the molds therewith, over the chucks under the feeding mechanism, where the molds are elevated from members 42 (and if desired also rotated) and a charge of clay fed thereto and then lowered onto said members, the latter advancing over the chucks under the forming assembly, where the molds are again elevated from members 42 and rotated while the charge is formed and again lowered onto said members, and finally said members advance at a higher elevation than when retracted, or at a height proportionate to the vertical position the tray has advanced during the retracting, feeding, forming and advancing operations, and the mold bearing the formed ware deposited onto the continuously moving tray, the members 42 then retracting and lowering to repeat the operation.

Fig. 10 illustrates a modified form of drive for the apparatus. In this instance the part 8$^a$ of the drive shaft and the clutch structure are dispensed with and the drive applied direct to the shaft 8 as by gear 44$^a$, which may be driven from drive pinion 43 or from any other suitable source, the drive being continuous as to that part of the apparatus primarily actuated from shaft 8. The conveyor may be intermittently actuated as by ratchet mechanism, an example of which is illustrated in Fig. 10. A ratchet gear 17$^a$ is substituted for the worm gear 17 as applied to shaft 21 in Fig. 1 and a lever 101 pivoted at its lower extremity to a bracket 7$^b$ as at 101$^a$ through the medium of the assembly illustrated in Figs. 5 and 6, and at its upper extremity to an adjustable-length ratchet bar 102, adjustable as by turn-buckle or screw 102$^a$, said ratchet bar 102 being adapted to engage and actuate on its forward stroke the ratchet gear 17$^a$ mounted on shaft 21. A cam 103 is secured on shaft 20 and adjustable as by screw 103$^a$, said cam being adapted to contact with a cam roller 104, rotatably mounted on lever 101, contact being maintained as by retraction spring 105, secured at opposite extremities, respectively, to said lever 101 and the frame 5. Latch 59 is mounted on bar $58^b$ and the latter pivotally secured to ratchet bar 102, said bar $58^b$ being pulled forwardly to bring said latch into locking engagement with the bottom of tray D as by a retraction spring 106, secured at opposite extremities, respectively, to bar $58^b$ and ratchet bar 102, and to trip said latch, a bracket extension $62^a$ is secured to or formed integrally with bearing pedestal $7^a$ and a pin 107 adjustably secured in the upper horizontally slotted portion thereof, said pin being adapted to contact with bar $58^b$. A pawl or dog 108 is pivotally mounted adjacent ratchet wheel $17^a$ and maintained in contact therewith as by spring $108^a$, to prevent back action of wheel $17^a$.

As shown in Fig. 10, the latch 59 is in released position, having been tripped by pin 107 contacting with bar $58^b$ on the return stroke of ratchet bar 102, the latter being primarily actuated by cam 103, and during the return stroke of said ratchet 102, the molds are removed from the trays D and charges fed thereto and formed and then returned to said trays, this phase of the operation being substantially similar to that described in connection with Figs. 1, 2 and 3. Approximately upon the completion of the forward stroke of ratchet bar 102, and during which time the conveyor and trays are moving upwardly, the latch will engage over the bottom of tray D, raising ratchet bar 102 out of engagement with ratchet wheel $17^a$ and preventing further movement of the conveyor and maintaining the tray in stable position during the mold removing and feeding, forming and replacing operations, as heretofore described.

As the ratchet bar 102 is released or raised from engagement by the tray engaging latch 59, said trays will come to rest each time when contacting with said latch, and thus the position at which said trays will stop is determined by the adjusted position of latch 59 on bar $58^b$, so that the trays may be halted each time at the same predetermined point regardless of the difference in spacing or irregular spacing of said trays in the conveyor.

Fig. 11 illustrates a modified form of mold carrier or tray D, wherein the latter is cut away and the centering bosses 64 secured on extensions $d$. By this means the mold-transferring members or forks 42 may move upwardly through the tray, if desired, when removing the molds therefrom, or said members need not be adjusted to slide under the flanges of the molds. This form of tray may prove advantageous in some instances.

In some instances it may not prove feasible to construct a machine of such size as will operate upon all of the molds carried by a tray during one complete cycle of the apparatus, and Figs. 14 and 15 illustrate a preferred construction whereby the fabricating mechanism as a unit may be shifted along the tray and successively operate upon the molds carried thereby, the mechanism completing a number of cycles during one actuation of the conveyor. The base 7 of the machine has adjustably secured thereon tracks or rails 109, as by bolts 110 passing through enlarged openings, and the fabricating mechanism as a unit is mounted on truck wheels 111, the lower frame structure being provided with brackets 112 in which said wheels are journaled. Stationary brackets 113, 114 and 115 may be bolted or otherwise secured to the base 7, and the shaft 20 is extended through and has bearing in the upper extremity of bracket 115, a drive pinion 116 being keyed on said shaft, the latter being longitudinally splined as at $116^a$ so that the shaft has free longitudinal sliding movement through said pinion, which is prevented from sliding laterally with said shaft by a bracket 117, secured to or forming part of bracket 115, on one side of said pinion and the bracket 115 on the other side thereof. Drive pinion 116 is adapted to mesh with a gear 118, secured on a counter shaft 119, the latter also having secured thereon the cam 103 as embodied in the structure illustrated by Fig. 10 and a drum or analogous cam or cam member 120, both of said cams being adjustably secured on shaft 119 as by the phase-changing structure shown in detail by Figs. 12 and 13, the counter shaft 119 being supported by and having bearing at opposite extremities in the brackets 113 and 115. Cam 120 is formed with an annular groove or track $120^a$ along a suitable portion of the length thereof, this groove being provided with a number of dwell portions, in the present instance two, these dwell portions corresponding in number to the number of times it is desired to halt the mechanism to perform a fabricating operation. The cam 120 serves to primarily impart the desired shifting movements to the fabricating mechanism along the mold-carrying trays, and one preferred method of connecting this cam to the movable frame is to fulcrum a lever 121 on the supporting bracket 114, as at $121^a$, this fulcrum point being shiftable or adjustable while in operation and while the driving connection subsists preferably through the medium of the structure illustrated in detail in Figs. 5 and 6, one extremity of said lever being provided with a pin $121^b$, adapted to ride in cam groove $120^a$, and the opposite extremity of said lever being pivoted as at 122 to one extremity of a bar or analogous member 123, the opposite extremity of bar 123 being pivotally connected to an extension bracket 124 of the frame of the mechanism, as at $123^a$, the pivot point $123^a$ also being shiftable or adjustable while in operation and while the driving connection subsists preferably through the medium of the structure illustrated in detail in Figs. 5 and 6. To prevent longitudinal displacement of the lever 121, said lever is arcuately slotted, as at 125, and a pin 125ª, stationarily secured in the bracket 114 or in a suitable part of the adjustment structure as regards longitudinal movement, projected into said slot. The latch 59 in the structure illustrated in Figs. 14 and 15 is braced against lateral strain by a bracket 126, suitably secured to the supporting bracket 62ª.

To intermittently drive the conveyor B in synchronism with the fabricating mechanism, substantially the same structure may be adopted as illustrated in Fig. 10, and as the drum cam 120 is secured on the same shaft as the cam 103, one complete revolution of shaft 119 will cause the fabricating mechanism as a unit to be moved back and forth along a tray each time the conveyor is actuated by cam 103, the number of times the mechanism is halted to perform a fabricating operation depending upon the number of dwell portions formed in cam groove 120ª and which will be in accordance with the number of molds carried by the tray relatively to the fabricating units embodied in the mechanism mounted to ride on the wheels 111.

By shifting the fulcrum point of lever 121, which may be done while in operation as above specified, the travel of the fabricating mechanism as a unit may be increased or decreased, and by adjusting the pivotal point 123ª, which may also ensue while in operation, the position of travel of said mechanism as a unit may be regulated, so that the mechanism may be easily positioned relatively to the molds on the tray at all times, as will be understood.

It will be understood that the fabricating mechanism herein disclosed could be used with any type of conveyor other than that shown and that other obvious modifications and adaptations could be made without departing from the scope of the invention as set forth in the appended claims.

What I claim as new is:

1. In apparatus of the class specified, the combination of a conveyor for molds and feeding and jiggering mechanism, means for driving said conveyor and mechanism, and mechanism operating in synchronism with said driving means for removing said molds from and replacing them on said conveyor.

2. In apparatus of the class specified, the combination of a conveyor for molds and feeding and jiggering mechanism, means for driving said conveyor and mechanism, and mechanism operating in synchronism with said driving means for removing said molds from said conveyor into operative adjacency to said feeding and jiggering mechanism and replacing said molds on said conveyor.

3. In apparatus of the class specified, the combination with a conveyor for molds having mold-carrying trays mounted thereon, of mold-transferring members, and means for alternately actuating said trays and said members to impart relative substantially right angular movement thereto in synchronism.

4. In apparatus of the class specified, mold-transferring members, cam means for imparting motion to said members, and means for adjusting, while in operation, the angular position of said cam means to thereby adjust the phase of said motion.

5. In apparatus of the class specified, the combination of a conveyor, mold carriers mounted in said conveyor, mechanism for removing and replacing molds relatively to said carriers, and shiftable means for alternately driving said conveyor and said mechanism, the drive being automatically shifted to said mechanism primarily through the movement of said carriers.

6. In apparatus of the class specified, the combination of a conveyor embodying mold carriers, intermittently moving mold-transferring members, shiftable mechanism for alternately actuating said members and said conveyor, and means for automatically shifting said mechanism when said carriers reach a predetermined position relatively to said members.

7. In apparatus of the class specified, the combination of a conveyor, mold carriers swingably mounted in said conveyor, intermittently moving mold-transferring mechanism, shiftable means for alternately driving said conveyor and said mechanism, and means cooperating with said carriers for automatically shifting the drive to said mold-transferring mechanism.

8. In apparatus of the class specified, the combination of a conveyor, mold carriers mounted in said conveyor, mold-transferring members, shiftable mechanism for alternately driving said conveyor and primarily actuating said members, and means cooperating with said carriers for automatically shifting said mechanism and temporarily halting said conveyor.

9. In apparatus of the class specified, the combination of a conveyor, mold carriers swingably mounted in said conveyor, means for driving said conveyor, mold-transferring members, means for actuating said members, a shiftable clutch, and latch means adjustable to halt the carriers at a predetermined position relatively to said members and shift the clutch.

10. In apparatus of the class specified, the combination of a conveyor, mold carriers swingably mounted in said conveyor, mold-transferring mechanism, means for alternately driving said conveyor and said mechanism including a shiftable clutch, movably mounted latch means adjacent said conveyor, and 11. In apparatus of the class specified, the combination of a conveyor, mold carriers mounted in said conveyor, mold-transferring mechanism, means for actuating said conveyor and mechanism, and adjustable latch means for intermittently halting said carriers.

12. In apparatus of the class specified, the combination with a drier having an endless conveyor mounted therein, of mechanism for feeding charges of plastic material to molds and forming said charges and shiftable mechanism for alternately driving said mechanism and conveyor in synchronism.

13. In apparatus of the class specified, the combination of mechanism for forming charges of plastic material and a conveyor, intermittently operating mold-transferring members, and mechanism adjustable to operate in synchronism with said conveyor and said forming mechanism for intermittently actuating said mold-transferring members.

14. In apparatus of the class specified, the combination of mechanism for feeding plastic material to molds and a conveyor, intermittently operating mold-transferring members, and mechanism adjustable to operate in synchronism with said conveyor and said feeding mechanism for intermittently actuating said mold-transferring members.

15. In apparatus of the class specified, the combination of a conveyor, mold carriers mounted in series in said conveyor, means for driving said conveyor, and means for intermittently halting said conveyor, said means operating to bring each successive carrier to a predetermined constant position of rest regardless of irregular spacing of the carriers in said conveyor.

16. In apparatus of the class specified, mold transferring mechanism, means for periodically actuating said mechanism, and adjustable cooperating cam and spring means for spotting the position of rest of said mechanism.

17. In apparatus of the class specified, mold transferring members, means for actuating said members comprising a system of pivotally connected levers, and means for adjusting while in operation, the pivotal connection of said members.

18. In apparatus of the class specified, mold-transferring members, means for substantially vertically reciprocating said members, and means for adjusting, while in operation, the altitude of such reciprocation.

19. In apparatus of the class specified, the combination with a mold-carrying tray, molds carried by said tray, of movably mounted fabricating mechanism, and means for reciprocating said mechanism as a unit longitudinally relatively to said tray to operate successively upon the molds carried thereby.

20. In apparatus of the class specified, the combination with a conveyor bearing mold carriers and means for actuating said conveyor, of fabricating mechanism shiftable as a unit, and means for shifting said fabricating mechanism laterally relatively to said mold carriers in synchronism with the means for actuating said conveyor.

21. In apparatus of the class specified, mold-transferring members, means for reciprocating said members, and means for adjusting while in operation the highest point of reciprocation of said members without affecting the lowest point of reciprocation.

22. In apparatus of the class specified, mold-transferring members, means for reciprocating said members, and means for adjusting while in operation the lowest point of reciprocation without affecting the highest point of reciprocation of said members.

23. In apparatus of the class specified, a means for transferring molds including substantially parallel levers, and means for varying while in operation the throw of said levers.

24. In apparatus of the class specified, a means for transferring molds comprising mold-carrying members and pivotally mounted levers, cams for actuating said levers, said levers being so mounted as to reciprocate said mold-carrying members in a substantially rectilinear path.

25. In apparatus of the class specified, a conveyor, mold-carriers mounted in series in said conveyor, mold-transferring members adapted to operate in synchronism with said conveyor, said carriers being provided with adjustable mold-centering and positioning bosses to facilitate the operation of said mold-transferring members.

26. In apparatus of the class specified, a conveyor having a vertically traveling section therein, mold-carriers mounted in series in said conveyor, mold-carrying and transferring members, and a system of cams and levers for actuating said members in synchronism with the travel of said conveyor and at substantially right-angles to the vertically traveling section thereof.

Signed by me this 17th day of January, 1928.

WILLIAM J. MILLER.